United States Patent
Eronen et al.

(10) Patent No.: US 11,010,051 B2
(45) Date of Patent: May 18, 2021

(54) VIRTUAL SOUND MIXING ENVIRONMENT

(71) Applicant: Nokia Technologies Oy, Espoo (FI)

(72) Inventors: Antti Eronen, Tampere (FI); Arto Lehtiniemi, Lempäälä (FI); Jussi Leppänen, Tampere (FI); Veli-Matti Kolmonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 16 days.

(21) Appl. No.: 16/308,539

(22) PCT Filed: Jun. 2, 2017

(86) PCT No.: PCT/FI2017/050415
§ 371 (c)(1),
(2) Date: Dec. 10, 2018

(87) PCT Pub. No.: WO2017/220853
PCT Pub. Date: Dec. 28, 2017

(65) Prior Publication Data
US 2019/0138207 A1 May 9, 2019

(30) Foreign Application Priority Data
Jun. 22, 2016 (EP) .................................. 16175815

(51) Int. Cl.
*G06F 3/0481* (2013.01)
*G06F 3/0488* (2013.01)
(Continued)

(52) U.S. Cl.
CPC .......... *G06F 3/04886* (2013.01); *G06F 3/011* (2013.01); *G06F 3/012* (2013.01);
(Continued)

(58) Field of Classification Search
CPC ............. G06F 3/04886; G06F 3/04845; G06F 3/04847; G06F 3/012; G06F 3/165; G06F 3/017
See application file for complete search history.

(56) References Cited

U.S. PATENT DOCUMENTS

| 2003/0074119 A1* | 4/2003 | Arlinsky | ................ B60K 35/00 701/36 |
| 2004/0128012 A1* | 7/2004 | Lin | .......................... G06F 3/014 700/100 |

(Continued)

FOREIGN PATENT DOCUMENTS

| EP | 3174316 A1 | 5/2017 |
| EP | 3174317 A1 | 5/2017 |

(Continued)

OTHER PUBLICATIONS

Office action received for corresponding Vietnam Patent Application No. 1-2018-05950, dated Feb. 20, 2019, 1 page of office action and 1 page of Translation available.

(Continued)

*Primary Examiner* — Rinna Yi
(74) *Attorney, Agent, or Firm* — Alston & Bird LLP

(57) ABSTRACT

According to various, but not necessarily all, embodiments of the invention there is provided a method comprising: enabling display to a user of a virtual visual scene; in dependence upon detection of an occurrence of a predetermined action by a user, starting display to the user of one or more control visual elements in the virtual visual scene while the virtual visual scene is being displayed to the user; and enabling interaction by the user with the one or more control visual elements within the displayed virtual visual scene to enable control while the virtual visual scene is being displayed to the user, wherein the one or more control visual elements displayed in the virtual visual scene represent a (Continued)

controller device physically used by the user, within the virtual visual scene, wherein the predetermined action by the user is in relation to a first portion of the physical controller device physically used by the user, and wherein the one or more control visual elements displayed in the virtual visual scene represent at least the first portion of the physical controller device within the virtual visual scene.

20 Claims, 9 Drawing Sheets

(51) Int. Cl.
  *G06F 3/0484* (2013.01)
  *G06F 3/01* (2006.01)
  *G06F 3/16* (2006.01)

(52) U.S. Cl.
  CPC .......... *G06F 3/017* (2013.01); *G06F 3/04815* (2013.01); *G06F 3/04847* (2013.01); *G06F 3/04883* (2013.01); *G06F 3/165* (2013.01); *G06F 3/167* (2013.01); *G06F 3/04845* (2013.01)

(56) References Cited

U.S. PATENT DOCUMENTS

| | | |
|---|---|---|
| 2006/0022956 A1 | 2/2006 | Lengeling et al. |
| 2013/0226593 A1* | 8/2013 | Magnusson ............ H04N 5/765 704/276 |
| 2016/0093105 A1 | 3/2016 | Rimon et al. |

FOREIGN PATENT DOCUMENTS

| | | |
|---|---|---|
| EP | 3209033 A1 | 8/2017 |
| EP | 3209034 A1 | 8/2017 |
| EP | 3232689 A1 | 10/2017 |
| EP | 3236345 A1 | 10/2017 |
| GB | 2277239 A | 10/1994 |
| GB | 2540224 A | 1/2017 |
| GB | 2540225 A | 1/2017 |
| GB | 2543275 A | 4/2017 |
| GB | 2543276 A | 4/2017 |
| GB | 2551521 A | 12/2017 |
| WO | 01/94156 A2 | 12/2001 |

OTHER PUBLICATIONS

"Reach Into the Future of Virtual and Augmented Reality",Leap Motion, Retrieved on Dec. 5, 2018, Webpage available at : https://www.leapmotion.com/.

Extended European Search Report received for corresponding European Patent Application No. 16175815.6, dated Dec. 7, 2016, 13 pages.

Kim et al., "Using Keyboards with Head Mounted Displays", Proceedings of the 2004 ACM SIGGRAPH international conference on Virtual Reality continuum and its applications in industry, Jun. 16-18, 2004, pp. 336-343.

JOT, "Real-Time Spatial Processing of Sounds for Music, Multimedia and Interactive Human-Computer Interfaces", Multimedia Systems, vol. 7, No. 1, Jan. 1999, pp. 55-69.

International Search Report and Written Opinion received for corresponding Patent Cooperation Treaty Application No. PCT/FI2017/050415, dated Aug. 7, 2017, 16 pages.

* cited by examiner

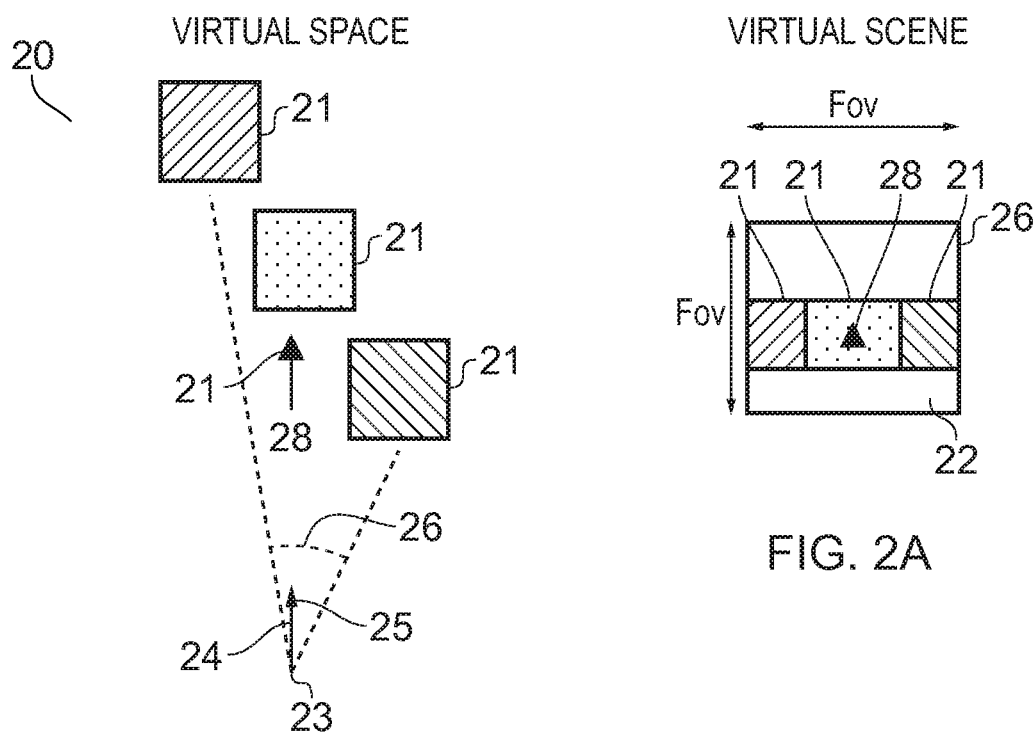
FIG. 1A
FIG. 2A
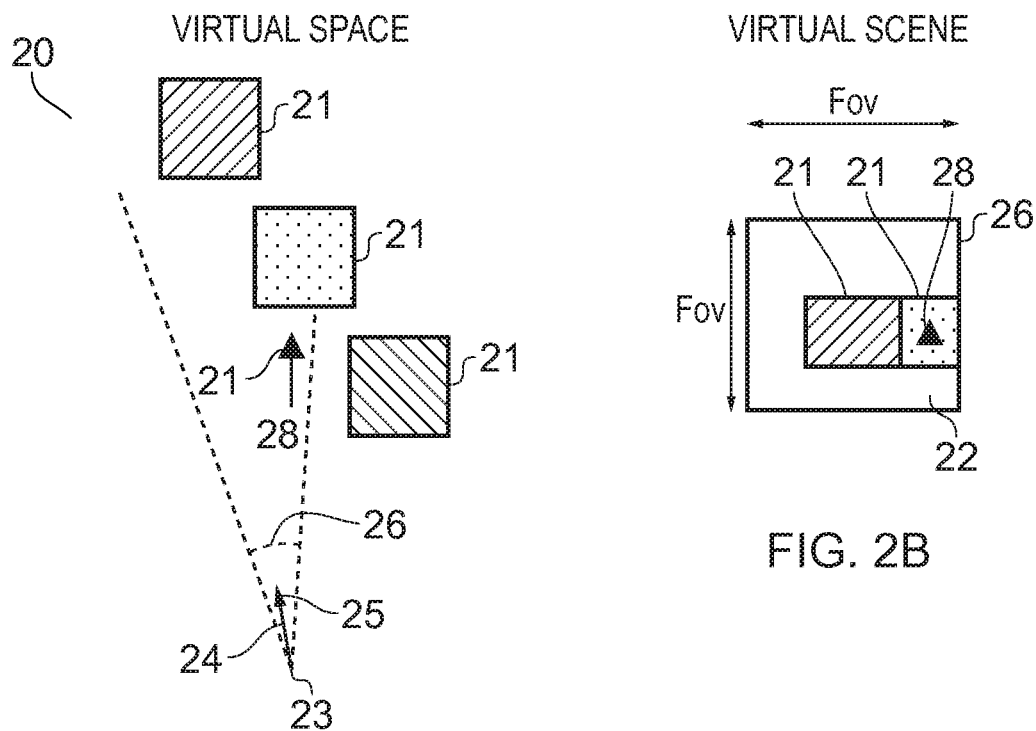
FIG. 1B
FIG. 2B

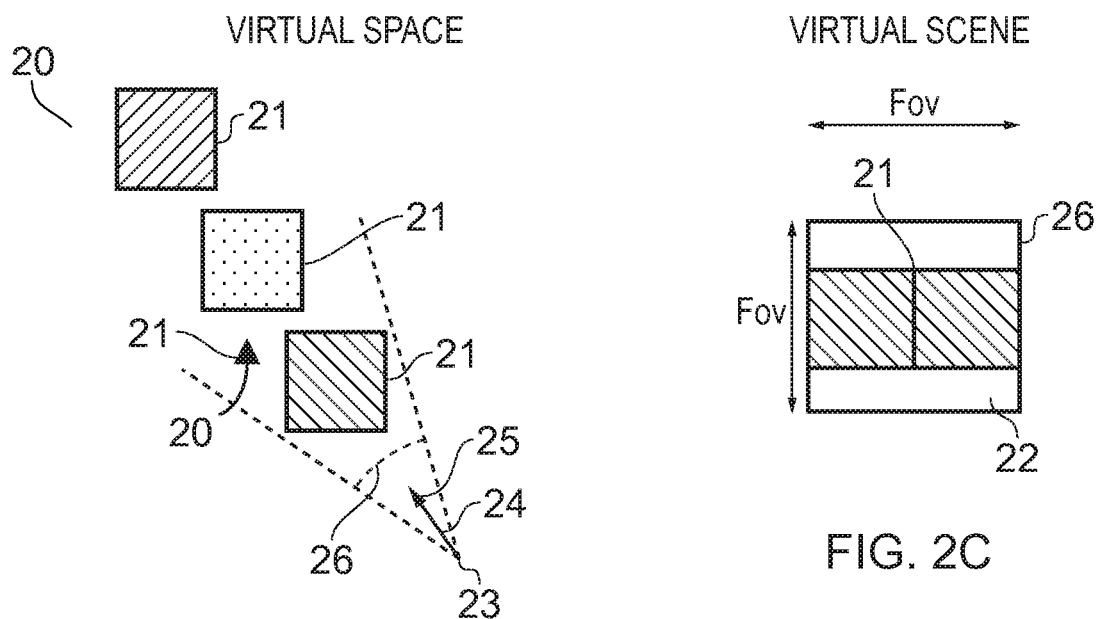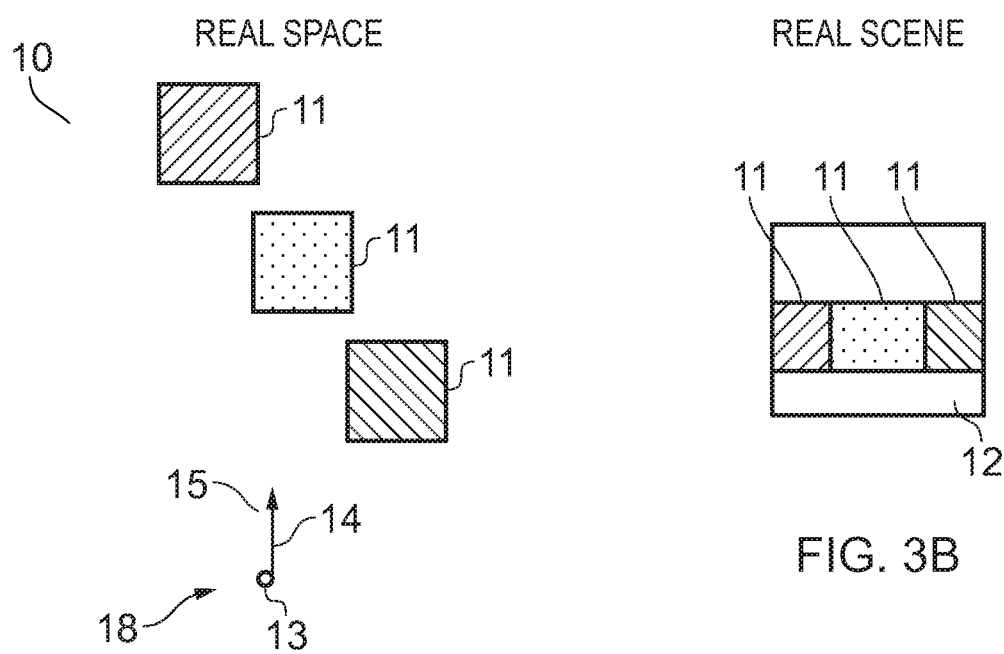

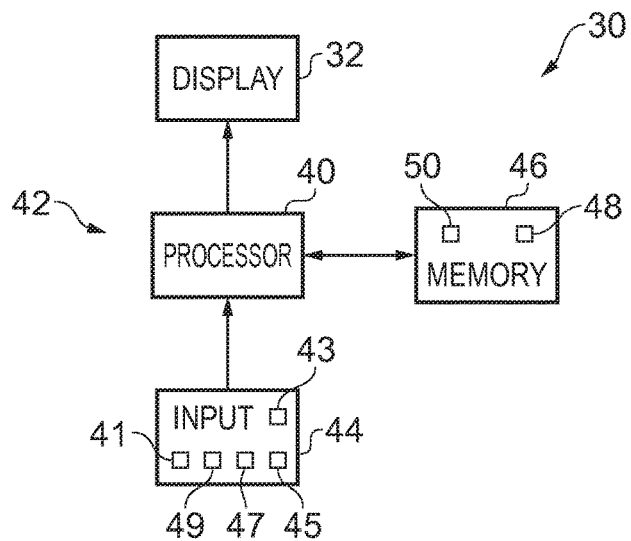
FIG. 4
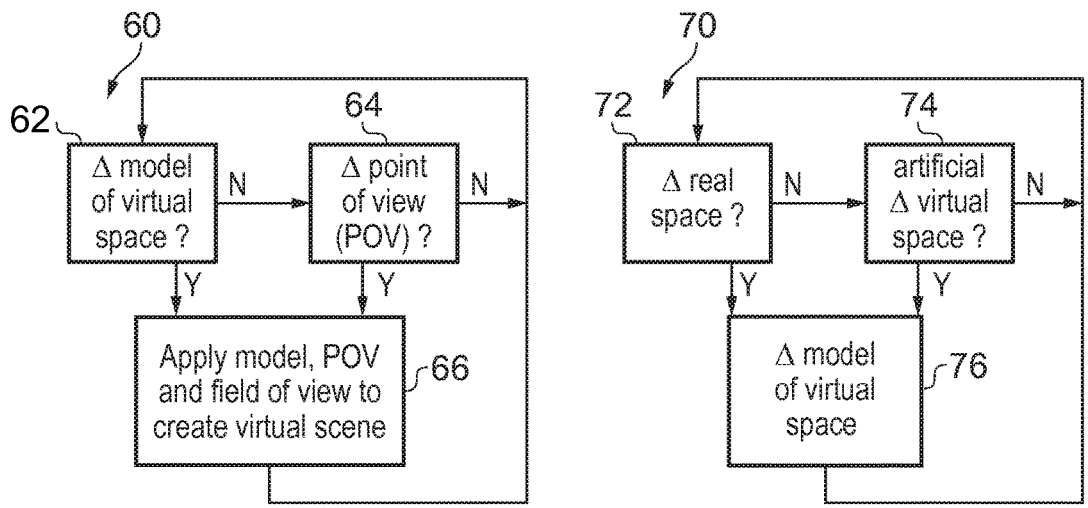
FIG. 5A
FIG. 5B

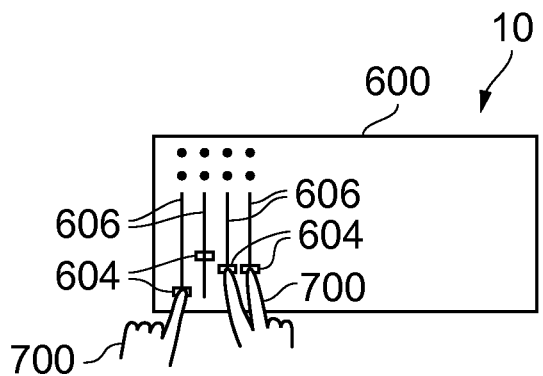
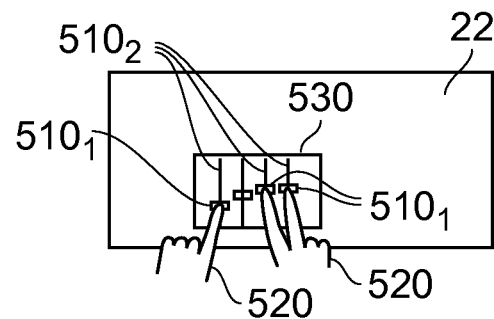
FIG. 19A    FIG. 19B
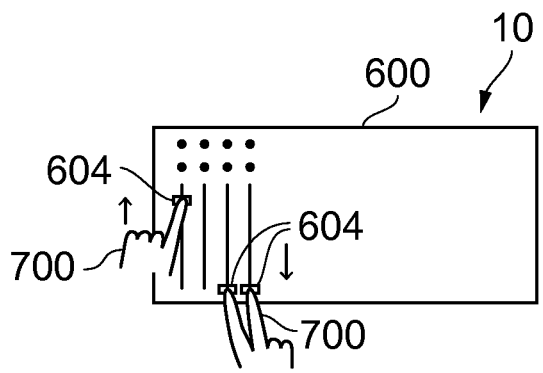
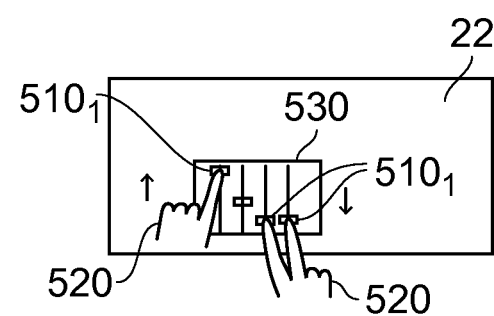
FIG. 20A    FIG. 20B
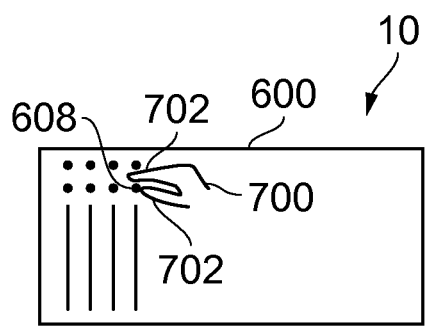
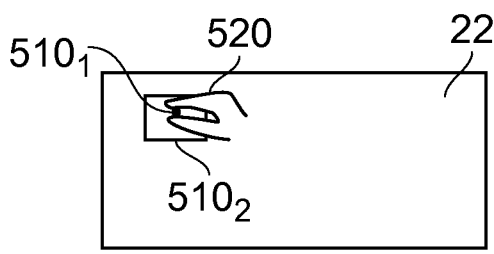
FIG. 21A    FIG. 21B

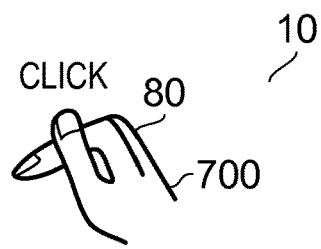 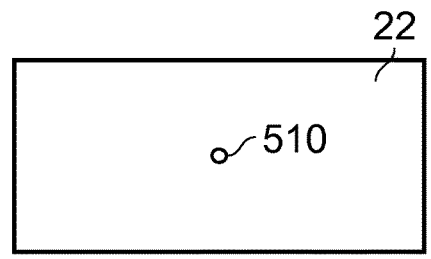
FIG. 22A  FIG. 22B
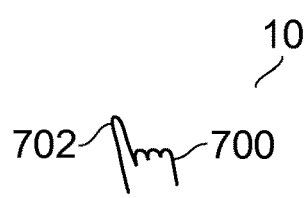 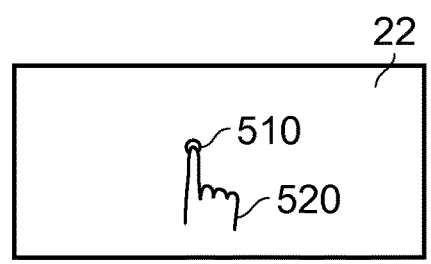
FIG. 23A  FIG. 23B
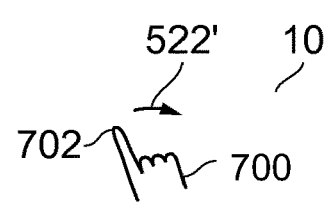 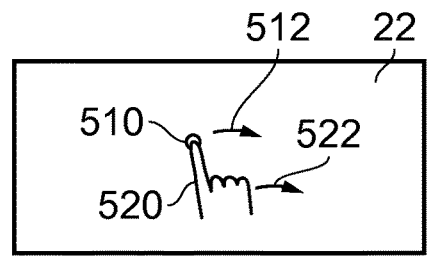
FIG. 24A  FIG. 24B
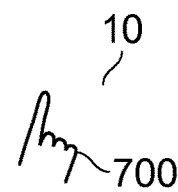 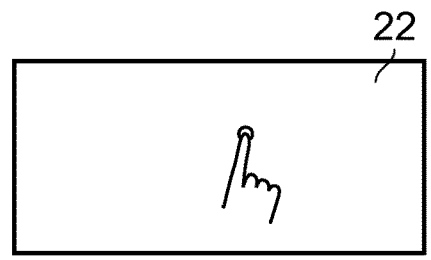
FIG. 25A  FIG. 25B

VIRTUAL SOUND MIXING ENVIRONMENT

RELATED APPLICATION

This application was originally filed as Patent Cooperation Treaty Application No. PCT/FI2017/050415 filed Jun. 2, 2017, which claims priority benefit to EP Patent Application No. 16175815.6, filed Jun. 22, 2016.

TECHNOLOGICAL FIELD

Embodiments of the present invention relate to mediated reality for example augmented reality or virtual reality.

BACKGROUND

Mediated reality in this document refers to a user experiencing a fully or partially artificial environment.

Augmented reality is a form of mediated reality in which a user experiences a partially artificial, partially real environment. Virtual reality is a form of mediated reality in which a user experiences a fully artificial environment.

BRIEF SUMMARY

According to various, but not necessarily all, embodiments of the invention there is provided a method comprising: enabling display to a user of a virtual visual scene; in dependence upon detection of an occurrence of a predetermined action by a user, starting display to the user of one or more control visual elements in the virtual visual scene while the virtual visual scene is being displayed to the user; and enabling interaction by the user with the one or more control visual elements within the displayed virtual visual scene to enable control while the virtual visual scene is being displayed to the user, wherein the one or more control visual elements displayed in the virtual visual scene represent a controller device physically used by the user, within the virtual visual scene, wherein the predetermined action by the user is in relation to a first portion of the physical controller device physically used by the user, and wherein the one or more control visual elements displayed in the virtual visual scene represent at least the first portion of the physical controller device within the virtual visual scene.

According to various, but not necessarily all, embodiments of the invention there is provided a method comprising: enabling display to a user of a virtual visual scene and simultaneous rendering to the user of a sound scene corresponding to the virtual visual scene; in dependence upon detection of an occurrence of a predetermined action by a user, starting display to the user of one or more sound-control visual elements in the virtual visual scene while the virtual visual scene is being displayed to the user; and enabling interaction by the user with the one or more sound-control visual elements within the displayed virtual visual scene to enable control of the corresponding sound scene while the virtual visual scene is being displayed to the user and the sound scene is being simultaneously rendered to the user.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene that partially corresponds with the virtual visual scene of FIG. 1B;

FIG. 4 illustrates an example of an apparatus that is operable to enable mediated reality and/or augmented reality and/or virtual reality;

FIG. 5A illustrates an example of a method for enabling mediated reality and/or augmented reality and/or virtual reality;

FIG. 5B illustrates an example of a method for updating a model of the virtual visual space for augmented reality;

FIGS. 19A, 20A illustrate a mixing console and FIGS. 19B, 20B illustrate a virtual visual scene adapted in dependence upon multi-touch sliding inputs by the user at the mixing console;

Figure 6A:
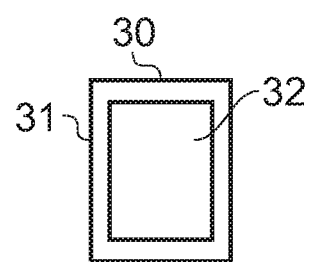
FIGS. 6A and 6B illustrate examples of apparatus that enable display of at least parts of the virtual visual scene to a user.

FIG. 21A illustrates a mixing console and FIG. 21B illustrates a virtual visual scene adapted in dependence upon a single knob-rotation input by the user at the mixing console; and FIG. 22A-25B illustrate an example of an application of the method, where a predetermined action by a user (FIG. 22A), triggers display in a virtual visual scene of a sound-control visual element (FIG. 22B) and the control of a sound scene by user interaction with the sound-control visual element (FIG. 23A-25B)

DEFINITIONS

"virtual visual space" refers to fully or partially artificial environment that may be viewed, which may be three dimensional.

"virtual visual scene" refers to a representation of the virtual visual space viewed from a particular point of view within the virtual visual space.

"real space" refers to a real environment, which may be three dimensional.

"real visual scene" refers to a representation of the real space viewed from a particular point of view within the real space.

"mediated reality" in this document refers to a user visually experiencing a fully or partially artificial environment (a virtual visual space) as a virtual visual scene at least partially displayed by an apparatus to a user. The virtual visual scene is determined by a point of view within the virtual visual space and a field of view. Displaying the virtual visual scene means providing it in a form that can be seen by the user.

"augmented reality" in this document refers to a form of mediated reality in which a user visually experiences a partially artificial environment (a virtual visual space) as a virtual visual scene comprising a real visual scene of a physical real world environment (real space) supplemented by one or more visual elements displayed by an apparatus to a user;

"virtual reality" in this document refers to a form of mediated reality in which a user visually experiences a fully artificial environment (a virtual visual space) as a virtual visual scene displayed by an apparatus to a user;

"perspective-mediated" as applied to mediated reality, augmented reality or virtual reality means that user actions determine the point of view within the virtual visual space, changing the virtual visual scene;

"first person perspective-mediated" as applied to mediated reality, augmented reality or virtual reality means perspective mediated with the additional constraint that the user's real point of view determines the point of view within the virtual visual space;

"third person perspective-mediated" as applied to mediated reality, augmented reality or virtual reality means perspective mediated with the additional constraint that the user's real point of view does not determine the point of view within the virtual visual space;

"user interactive-mediated" as applied to mediated reality, augmented reality or virtual reality means that user actions at least partially determine what happens within the virtual visual space;

"displaying" means providing in a form that is perceived visually (viewed) by the user.

"rendering" means providing in a form that is perceived by the user

"sound space" refers to an arrangement of sound sources in a three-dimensional space. A sound space may be defined in relation to recording sounds (a recorded sound space) and in relation to rendering sounds (a rendered sound space).

"sound scene" refers to a representation of the sound space listened to from a particular point of view within the sound space.

"sound object" refers to sound that may be located within the sound space. A source sound object represents a sound source within the sound space. A recorded sound object represents sounds recorded at a particular microphone.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene means that the sound space and virtual visual space are corresponding and a notional listener whose point of view defines the sound scene and a notional viewer whose point of view defines the virtual visual scene are at the same position and orientation, that is they have the same point of view.

DESCRIPTION

FIGS. 1A-1C and 2A-2C illustrate examples of mediated reality. The mediated reality may be augmented reality or virtual reality.

FIGS. 1A, 1B, 1C illustrate the same virtual visual space 20 comprising the same virtual objects 21, however, each Fig illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1C.

FIGS. 2A, 2B, 2C illustrate a virtual visual scene 22 from the perspective of the different points of view 24 of respective FIGS. 1A, 1B, 1C. The virtual visual scene 22 is determined by the point of view 24 within the virtual visual space 20 and a field of view 26. The virtual visual scene 22 is at least partially displayed to a user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual object 21 such as a visual element 28 within the virtual visual space 20.

The mediated reality, augmented reality or virtual reality may be perspective-mediated. In this case, user actions determine the point of view 24 within the virtual visual space 20, changing the virtual visual scene 22. For example, as illustrated in FIGS. 1A, 1B, 1C a position 23 of the point of view 24 within the virtual visual space 20 may be changed and/or a direction or orientation 25 of the point of view 24 within the virtual visual space 20 may be changed. If the virtual visual space 20 is three-dimensional, the position 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates a real space 10 comprising real objects 11 that partially corresponds with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates a real visual scene 12 that partially corresponds with the virtual visual scene 22 of FIG. 1B, it includes real objects 11 but not artificial virtual objects. The real visual scene is from a perspective corresponding to the point of view 24 in the virtual visual space 20 of FIG. 1A. The real visual scene 12 content is determined by that corresponding point of view 24 and the field of view 26.

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to a user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single point of view 24 or on multiple images from different points of view 24 at the same time, processed to generate an image from a single point of view 24.

FIG. 4 illustrates an example of an apparatus 30 that is operable to enable mediated reality and/or augmented reality and/or virtual reality.

The apparatus 30 comprises a display 32 for providing at least parts of the virtual visual scene 22 to a user in a form that is perceived visually by the user. The display 32 may be a visual display that provides light that displays at least parts of the virtual visual scene 22 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods illustrated in FIGS. 5A & 5B. The processor 40 by reading the memory 46 is able to load and execute the computer program 48.

The blocks illustrated in the FIGS. 5A & 5B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The apparatus 30 may enable mediated reality and/or augmented reality and/or virtual reality, for example using the method 60 illustrated in FIG. 5A or a similar method. The controller 42 stores and maintains a model 50 of the virtual visual space 20. The model may be provided to the controller 42 or determined by the controller 42. For example, sensors in input circuitry 44 may be used to create overlapping depth maps of the virtual visual space from different points of view and a three dimensional model may then be produced.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a position of the object.

At block 62 it is determined whether or not the model of the virtual visual space 20 has changed. If the model of the virtual visual space 20 has changed the method moves to block 66. If the model of the virtual visual space 20 has not changed the method moves to block 64.

At block 64 it is determined whether or not the point of view 24 in the virtual visual space 20 has changed. If the point of view 24 has changed the method moves to block 66. If the point of view 24 has not changed the method returns to block 62.

At block 66, a two-dimensional projection of the three-dimensional virtual visual space 20 is taken from the location 23 and in the direction 25 defined by the current point of view 24. The projection is then limited by the field of view 26 to produce the virtual visual scene 22. The method then returns to block 62.

Where the apparatus 30 enables augmented reality, the virtual visual space 20 comprises objects 11 from the real space 10 and also visual elements 28 not present in the real space 10. The combination of such visual elements 28 may be referred to as the artificial virtual visual space. FIG. 5B illustrates a method 70 for updating a model of the virtual visual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual visual space 20, changing the virtual visual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the controller 42 to determine the point of view 24 within the virtual visual space 20, changing the virtual visual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation by measuring a change in orientation of the user's head and/or a change in the user's direction of gaze.

In some but not necessarily all examples, the apparatus 30 comprises as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6B:
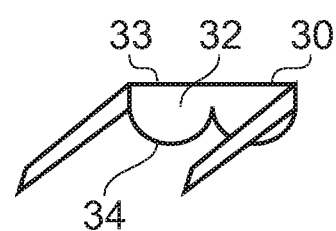

FIGS. 6A and 6B illustrate examples of apparatus 30 that enable display of at least parts of the virtual visual scene 22 to a user.

FIG. 6A illustrates a handheld apparatus 31 comprising a display screen as display 32 that displays images to a user and is used for displaying the virtual visual scene 22 to the user. The apparatus 30 may be moved deliberately in the hands of a user in one or more of the previously mentioned six degrees of freedom. The handheld apparatus 31 may house the sensors 45 for determining changes in the real point of view from a change in orientation of the apparatus 30.

The handheld apparatus 31 may be or may be operated as a see-video arrangement for augmented reality that enables a live or recorded video of a real visual scene 12 to be displayed on the display 32 for viewing by the user while one or more visual elements 28 are simultaneously displayed on the display 32 for viewing by the user. The combination of the displayed real visual scene 12 and displayed one or more visual elements 28 provides the virtual visual scene 22 to the user.

If the handheld apparatus 31 has a camera mounted on a face opposite the display 32, it may be operated as a see-video arrangement that enables a live real visual scene 12 to be viewed while one or more visual elements 28 are displayed to the user to provide in combination the virtual visual scene 22.

FIG. 6B illustrates a head-mounted apparatus 33 comprising a display 32 that displays images to a user. The head-mounted apparatus 33 may be moved automatically when a head of the user moves. The head-mounted apparatus 33 may house the sensors 45 for gaze direction detection and/or selection gesture detection.

The head-mounted apparatus 33 may be a see-through arrangement for augmented reality that enables a live real visual scene 12 to be viewed while one or more visual elements 28 are displayed by the display 32 to the user to provide in combination the virtual visual scene 22. In this case a visor 34, if present, is transparent or semi-transparent so that the live real visual scene 12 can be viewed through the visor 34.

The head-mounted apparatus 33 may be operated as a see-video arrangement for augmented reality that enables a live or recorded video of a real visual scene 12 to be displayed by the display 32 for viewing by the user while one or more visual elements 28 are simultaneously displayed by the display 32 for viewing by the user. The combination of the displayed real visual scene 12 and displayed one or more visual elements 28 provides the virtual visual scene 22 to the user. In this case a visor 34 is opaque and may be used as display 32.

Other examples of apparatus 30 that enable display of at least parts of the virtual visual scene 22 to a user may be used.

For example, one or more projectors may be used that project one or more visual elements to provide augmented reality by supplementing a real visual scene of a physical real world environment (real space).

For example, multiple projectors or displays may surround a user to provide virtual reality by presenting a fully artificial environment (a virtual visual space) as a virtual visual scene to the user.

Referring back to FIG. 4, an apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, finger movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in gesture recognition.

Figure 7A:
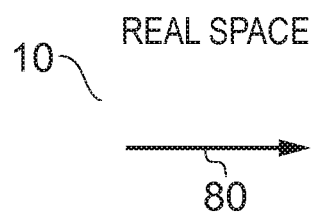
FIG. 7A, illustrates an example of a gesture in real space

Referring to FIG. 7A, a particular gesture 80 in the real space 10 is a gesture user input used as a 'user control' event by the controller 42 to determine what happens within the virtual visual space 20. A gesture user input is a gesture 80 that has meaning to the apparatus 30 as a user input.

Figure 7B:
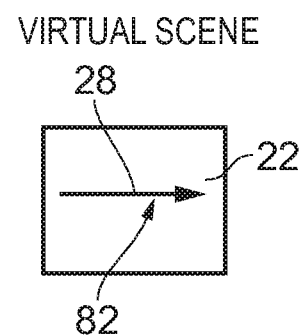
FIG. 7B, illustrates a corresponding representation rendered, in the virtual visual scene, of the gesture in real space.

Referring to FIG. 7B, illustrates that in some but not necessarily all examples, a corresponding representation of the gesture 80 in real space is rendered in the virtual visual scene 22 by the apparatus 30. The representation involves one or more visual elements 28 moving 82 to replicate or indicate the gesture 80 in the virtual visual scene 22.

A gesture 80 may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

A gesture 80 may be a non-contact gesture. A non-contact gesture does not contact the sensors at any time during the gesture.

A gesture 80 may be an absolute gesture that is defined in terms of an absolute displacement from the sensors. Such a gesture may be tethered, in that it is performed at a precise location in the real space 10. Alternatively a gesture 80 may be a relative gesture that is defined in terms of relative displacement during the gesture. Such a gesture may be un-tethered, in that it need not be performed at a precise location in the real space 10 and may be performed at a large number of arbitrary locations.

A gesture 80 may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement $\Delta d$ with relative time $\Delta t$.

A gesture 80 may be performed in one spatial dimension (1D gesture), two spatial dimensions (2D gesture) or three spatial dimensions (3D gesture).

Figure 8:
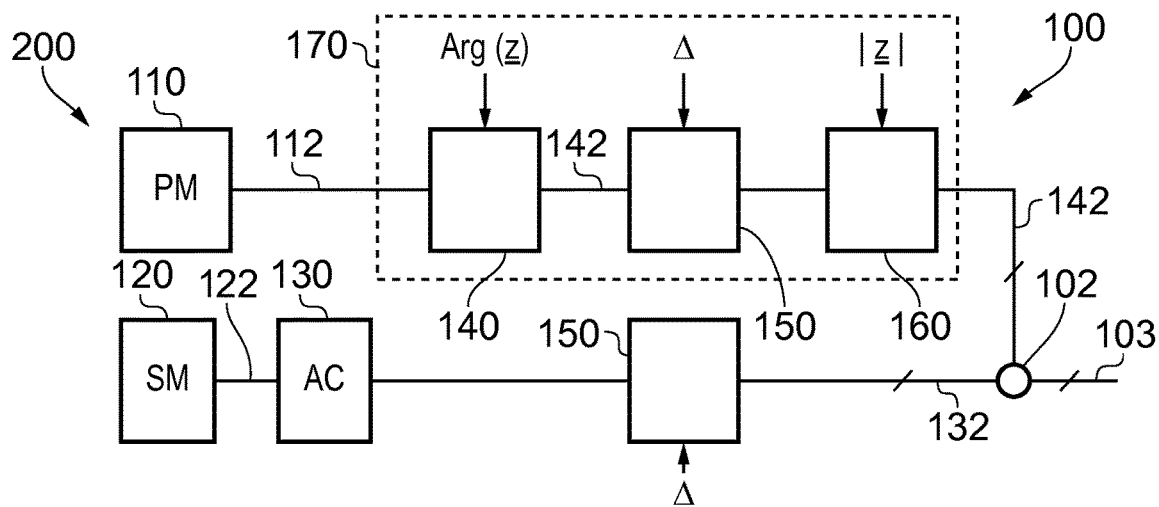
FIG. 8 illustrates an example of a system for modifying a rendered sound scene.

FIG. 8 illustrates an example of a system 100 and also an example of a method 200. The system 100 and method 200 record a sound space and process the recorded sound space to enable a rendering of the recorded sound space as a rendered sound scene for a listener at a particular position (the origin) and orientation within the sound space.

A sound space is an arrangement of sound sources in a three-dimensional space. A sound space may be defined in relation to recording sounds (a recorded sound space) and in relation to rendering sounds (a rendered sound space).

The system 100 comprises one or more portable microphones 110 and may comprise one or more static microphones 120.

In this example, but not necessarily all examples, the origin of the sound space is at a microphone. In this example, the microphone at the origin is a static microphone 120. It may record one or more channels, for example it may be a microphone array. However, the origin may be at any arbitrary position.

In this example, only a single static microphone 120 is illustrated. However, in other examples multiple static microphones 120 may be used independently.

The system 100 comprises one or more portable microphones 110. The portable microphone 110 may, for example, move with a sound source within the recorded sound space. The portable microphone may, for example, be an 'up-close' microphone that remains close to a sound source. This may be achieved, for example, using a boom microphone or, for example, by attaching the microphone to the sound source, for example, by using a Lavalier microphone. The portable microphone 110 may record one or more recording channels.

The relative position of the portable microphone PM 110 from the origin may be represented by the vector z. The vector z therefore positions the portable microphone 110 relative to a notional listener of the recorded sound space.

The relative orientation of the notional listener at the origin may be represented by the value Δ. The orientation value Δ defines the notional listener's 'point of view' which defines the sound scene. The sound scene is a representation of the sound space listened to from a particular point of view within the sound space.

When the sound space as recorded is rendered to a user (listener) via the system 100 in FIG. 1, it is rendered to the listener as if the listener is positioned at the origin of the recorded sound space with a particular orientation. It is therefore important that, as the portable microphone 110 moves in the recorded sound space, its position z relative to the origin of the recorded sound space is tracked and is correctly represented in the rendered sound space. The system 100 is configured to achieve this.

The audio signals 122 output from the static microphone 120 are coded by audio coder 130 into a multichannel audio signal 132. If multiple static microphones were present, the output of each would be separately coded by an audio coder into a multichannel audio signal.

The audio coder 130 may be a spatial audio coder such that the multichannel audio signals 132 represent the sound space as recorded by the static microphone 120 and can be rendered giving a spatial audio effect. For example, the audio coder 130 may be configured to produce multichannel audio signals 132 according to a defined standard such as, for example, binaural coding, 5.1 surround sound coding, 7.1 surround sound coding etc. If multiple static microphones were present, the multichannel signal of each static microphone would be produced according to the same defined standard such as, for example, binaural coding, 5.1 surround sound coding, and 7.1 surround sound coding and in relation to the same common rendered sound space.

The multichannel audio signals 132 from one or more the static microphones 120 are mixed by mixer 102 with multichannel audio signals 142 from the one or more portable microphones 110 to produce a multi-microphone multichannel audio signal 103 that represents the recorded sound scene relative to the origin and which can be rendered by an audio decoder corresponding to the audio coder 130 to reproduce a rendered sound scene to a listener that corresponds to the recorded sound scene when the listener is at the origin.

The multichannel audio signal 142 from the, or each, portable microphone 110 is processed before mixing to take account of any movement of the portable microphone 110 relative to the origin at the static microphone 120.

The audio signals 112 output from the portable microphone 110 are processed by the positioning block 140 to adjust for movement of the portable microphone 110 relative to the origin. The positioning block 140 takes as an input the vector z or some parameter or parameters dependent upon the vector z. The vector z represents the relative position of the portable microphone 110 relative to the origin.

The positioning block 140 may be configured to adjust for any time misalignment between the audio signals 112 recorded by the portable microphone 110 and the audio signals 122 recorded by the static microphone 120 so that they share a common time reference frame. This may be achieved, for example, by correlating naturally occurring or artificially introduced (non-audible) audio signals that are present within the audio signals 112 from the portable microphone 110 with those within the audio signals 122 from the static microphone 120. Any timing offset identified by the correlation may be used to delay/advance the audio signals 112 from the portable microphone 110 before processing by the positioning block 140.

The positioning block 140 processes the audio signals 112 from the portable microphone 110, taking into account the relative orientation (Arg(z)) of that portable microphone 110 relative to the origin at the static microphone 120.

The audio coding of the static microphone audio signals 122 to produce the multichannel audio signal 132 assumes a particular orientation of the rendered sound space relative to an orientation of the recorded sound space and the audio signals 122 are encoded to the multichannel audio signals 132 accordingly.

The relative orientation Arg (z) of the portable microphone 110 in the recorded sound space is determined and the audio signals 112 representing the sound object are coded to the multichannels defined by the audio coding 130 such that the sound object is correctly oriented within the rendered sound space at a relative orientation Arg (z) from the listener. For example, the audio signals 112 may first be mixed or encoded into the multichannel signals 142 and then a transformation T may be used to rotate the multichannel audio signals 142, representing the moving sound object, within the space defined by those multiple channels by Arg (z).

An orientation block 150 may be used to rotate the multichannel audio signals 142 by Δ, if necessary. Similarly, an orientation block 150 may be used to rotate the multichannel audio signals 132 by Δ, if necessary.

The functionality of the orientation block 150 is very similar to the functionality of the orientation function of the positioning block 140 except it rotates by Δ instead of Arg(z).

In some situations, for example when the sound scene is rendered to a listener through a head-mounted audio output device 300, for example headphones using binaural audio coding, it may be desirable for the rendered sound space 310 to remain fixed in space 320 when the listener turns their head 330 in space. This means that the rendered sound space 310 needs to be rotated relative to the audio output device 300 by the same amount in the opposite sense to the head rotation. The orientation of the rendered sound space 310 tracks with the rotation of the listener's head so that the orientation of the rendered sound space 310 remains fixed in space 320 and does not move with the listener's head 330.

The portable microphone signals 112 are additionally processed to control the perception of the distance D of the sound object from the listener in the rendered sound scene, for example, to match the distance |z| of the sound object from the origin in the recorded sound space. This can be useful when binaural coding is used so that the sound object is, for example, externalized from the user and appears to be at a distance rather than within the user's head, between the user's ears. The distance block 160 processes the multichannel audio signal 142 to modify the perception of distance.

Figure 9:
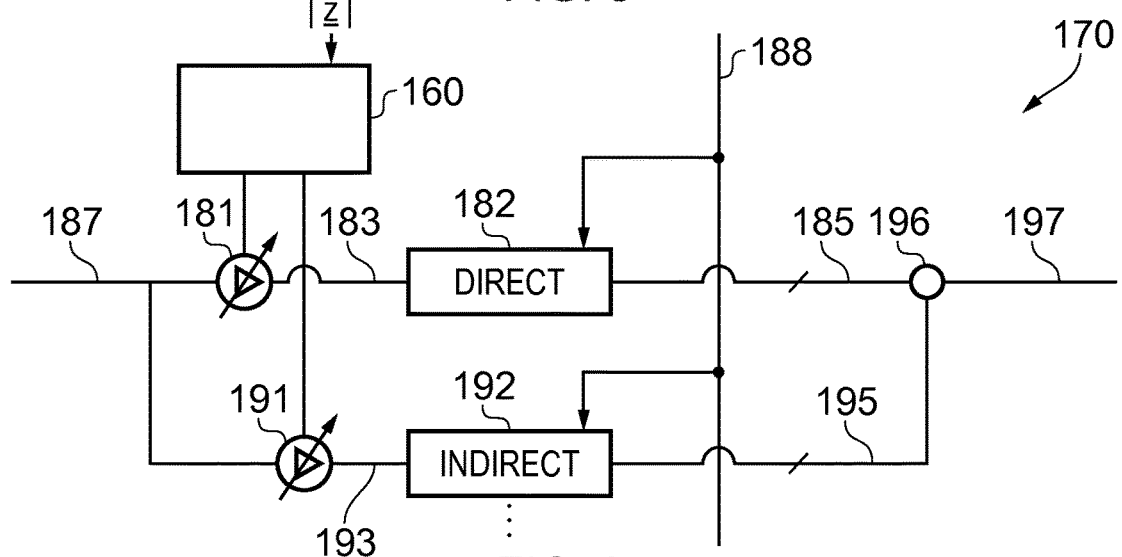
FIG. 9 illustrates an example of a module which may be used, for example, to perform the functions of the positioning block, orientation block and distance block of the system.

FIG. 9 illustrates a module 170 which may be used, for example, to perform the method 200 and/or functions of the positioning block 140, orientation block 150 and distance block 160 in FIG. 8. The module 170 may be implemented using circuitry and/or programmed processors.

The Figure illustrates the processing of a single channel of the multichannel audio signal 142 before it is mixed with the multichannel audio signal 132 to form the multi-microphone multichannel audio signal 103. A single input channel of the multichannel signal 142 is input as signal 187.

The input signal 187 passes in parallel through a "direct" path and one or more "indirect" paths before the outputs from the paths are mixed together, as multichannel signals, by mixer 196 to produce the output multichannel signal 197. The output multichannel signal 197, for each of the input channels, are mixed to form the multichannel audio signal 142 that is mixed with the multichannel audio signal 132.

The direct path represents audio signals that appear, to a listener, to have been received directly from an audio source and an indirect path represents audio signals that appear to a listener to have been received from an audio source via an indirect path such as a multipath or a reflected path or a refracted path.

The distance block 160 by modifying the relative gain between the direct path and the indirect paths, changes the perception of the distance D of the sound object from the listener in the rendered sound space 310.

Each of the parallel paths comprises a variable gain device 181, 191 which is controlled by the distance block 160.

The perception of distance can be controlled by controlling relative gain between the direct path and the indirect (decorrelated) paths. Increasing the indirect path gain relative to the direct path gain increases the perception of distance.

In the direct path, the input signal 187 is amplified by variable gain device 181, under the control of the distance block 160, to produce a gain-adjusted signal 183. The gain-adjusted signal 183 is processed by a direct processing module 182 to produce a direct multichannel audio signal 185.

In the indirect path, the input signal 187 is amplified by variable gain device 191, under the control of the distance block 160, to produce a gain-adjusted signal 193. The gain-adjusted signal 193 is processed by an indirect processing module 192 to produce an indirect multichannel audio signal 195.

The direct multichannel audio signal 185 and the one or more indirect multichannel audio signals 195 are mixed in the mixer 196 to produce the output multichannel audio signal 197.

The direct processing block 182 and the indirect processing block 192 both receive direction of arrival signals 188. The direction of arrival signal 188 gives the orientation Arg(z) of the portable microphone 110 (moving sound object) in the recorded sound space and the orientation Δ of the rendered sound space 310 relative to the notional listener/audio output device 300.

The position of the moving sound object changes as the portable microphone 110 moves in the recorded sound space and the orientation of the rendered sound space changes as a head-mounted audio output device, rendering the sound space rotates.

The direct processing block 182 may, for example, include a system 184 that rotates the single channel audio signal, gain-adjusted input signal 183, in the appropriate multichannel space producing the direct multichannel audio signal 185. The system uses a transfer function to performs a transformation T that rotates multichannel signals within the space defined for those multiple channels by Arg(z) and by Δ, defined by the direction of arrival signal 188. For example, a head related transfer function (HRTF) interpolator may be used for binaural audio. As another example, Vector Base Amplitude Panning (VBAP) may be used for loudspeaker format (e.g. 5.1) audio.

The indirect processing block 192 may, for example, use the direction of arrival signal 188 to control the gain of the single channel audio signal, the gain-adjusted input signal 193, using a variable gain device 194. The amplified signal is then processed using a static decorrelator 196 and a static transformation T to produce the indirect multichannel audio signal 195. The static decorrelator in this example uses a pre-delay of at least 2 ms. The transformation T rotates multichannel signals within the space defined for those multiple channels in a manner similar to the direct system but by a fixed amount. For example, a static head related transfer function (HRTF) interpolator may be used for binaural audio.

It will therefore be appreciated that the module 170 can be used to process the portable microphone signals 112 and perform the functions of:

(i) changing the relative position (orientation Arg(z) and/or distance |z|) of a sound object, from a listener in the rendered sound space and (ii) changing the orientation of the rendered sound space (including the sound object positioned according to (i)).

It should also be appreciated that the module 170 may also be used for performing the function of the orientation block 150 only, when processing the audio signals 122 provided by the static microphone 120. However, the direction of arrival signal will include only Δ and will not include Arg(z). In some but not necessarily all examples, gain of the variable gain devices 191 modifying the gain to the indirect paths may be put to zero and the gain of the variable gain device 181 for the direct path may be fixed. In this instance, the module 170 reduces to a system that rotates the recorded sound space to produce the rendered sound space according to a direction of arrival signal that includes only Δ and does not include Arg(z).

Figure 10:
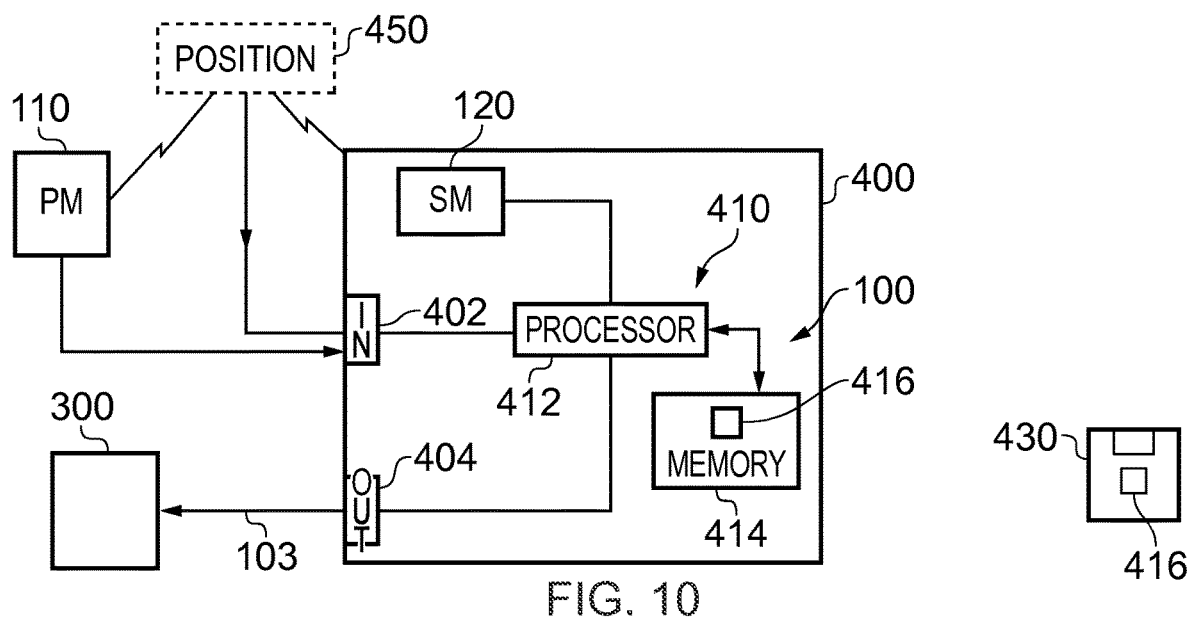
FIG. 10 illustrates an example of the system/module implemented using an apparatus.

FIG. 10 illustrates an example of the system 100 implemented using an apparatus 400. The apparatus 400 may, for example, be a static electronic device, a portable electronic device or a hand-portable electronic device that has a size that makes it suitable to carried on a palm of a user or in an inside jacket pocket of the user.

In this example, the apparatus 400 comprises the static microphone 120 as an integrated microphone but does not comprise the one or more portable microphones 110 which are remote. In this example, but not necessarily all examples, the static microphone 120 is a microphone array. However, in other examples, the apparatus 400 does not comprise the static microphone 120.

The apparatus 400 comprises an external communication interface 402 for communicating externally with external microphones, for example, the remote portable microphone(s) 110. This may, for example, comprise a radio transceiver.

A positioning system 450 is illustrated as part of the system 100. This positioning system 450 is used to position the portable microphone(s) 110 relative to the origin of the sound space e.g. the static microphone 120. In this example, the positioning system 450 is illustrated as external to both the portable microphone 110 and the apparatus 400. It provides information dependent on the position z of the portable microphone 110 relative to the origin of the sound space to the apparatus 400. In this example, the information is provided via the external communication interface 402, however, in other examples a different interface may be used. Also, in other examples, the positioning system may be wholly or partially located within the portable microphone 110 and/or within the apparatus 400.

The position system 450 provides an update of the position of the portable microphone 110 with a particular frequency and the term 'accurate' and 'inaccurate' positioning of the sound object should be understood to mean accurate or inaccurate within the constraints imposed by the frequency of the positional update. That is accurate and inaccurate are relative terms rather than absolute terms.

The position system 450 enables a position of the portable microphone 110 to be determined. The position system 450 may receive positioning signals and determine a position which is provided to the processor 412 or it may provide positioning signals or data dependent upon positioning signals so that the processor 412 may determine the position of the portable microphone 110.

There are many different technologies that may be used by a position system 450 to position an object including passive systems where the positioned object is passive and does not produce a positioning signal and active systems where the positioned object produces one or more positioning signals. An example of system, used in the Kinect™ device, is when an object is painted with a non-homogenous pattern of symbols using infrared light and the reflected light is measured using multiple cameras and then processed, using the parallax effect, to determine a position of the object. An example of an active radio positioning system is when an object has a transmitter that transmits a radio positioning signal to multiple receivers to enable the object to be positioned by, for example, trilateration or triangulation. An example of a passive radio positioning system is when an object has a receiver or receivers that receive a radio positioning signal from multiple transmitters to enable the object to be positioned by, for example, trilateration or triangulation. Trilateration requires an estimation of a distance of the object from multiple, non-aligned, transmitter/receiver locations at known positions. A distance may, for example, be estimated using time of flight or signal attenuation. Triangulation requires an estimation of a bearing of the object from multiple, non-aligned, transmitter/receiver locations at known positions. A bearing may, for example, be estimated using a transmitter that transmits with a variable narrow aperture, a receiver that receives with a variable narrow aperture, or by detecting phase differences at a diversity receiver.

Other positioning systems may use dead reckoning and inertial movement or magnetic positioning.

The object that is positioned may be the portable microphone 110 or it may an object worn or carried by a person associated with the portable microphone 110 or it may be the person associated with the portable microphone 110.

The apparatus 400 wholly or partially operates the system 100 and method 200 described above to produce a multi-microphone multichannel audio signal 103.

The apparatus 400 provides the multi-microphone multichannel audio signal 103 via an output communications interface 404 to an audio output device 300 for rendering.

In some but not necessarily all examples, the audio output device 300 may use binaural coding. Alternatively or additionally, in some but not necessarily all examples, the audio output device 300 may be a head-mounted audio output device.

In this example, the apparatus 400 comprises a controller 410 configured to process the signals provided by the static microphone 120 and the portable microphone 110 and the positioning system 450. In some examples, the controller 410 may be required to perform analogue to digital conversion of signals received from microphones 110, 120 and/or perform digital to analogue conversion of signals to the audio output device 300 depending upon the functionality at the microphones 110, 120 and audio output device 300. However, for clarity of presentation no converters are illustrated in FIG. 9.

Implementation of a controller 410 may be as controller circuitry. The controller 410 may be implemented in hardware alone, have certain aspects in software including firmware alone or can be a combination of hardware and software (including firmware).

As illustrated in FIG. 10 the controller 410 may be implemented using instructions that enable hardware functionality, for example, by using executable instructions of a computer program 416 in a general-purpose or special-purpose processor 412 that may be stored on a computer readable storage medium (disk, memory etc) to be executed by such a processor 412.

The processor 412 is configured to read from and write to the memory 414. The processor 412 may also comprise an output interface via which data and/or commands are output by the processor 412 and an input interface via which data and/or commands are input to the processor 412.

The memory 414 stores a computer program 416 comprising computer program instructions (computer program code) that controls the operation of the apparatus 400 when loaded into the processor 412. The computer program instructions, of the computer program 416, provide the logic and routines that enables the apparatus to perform the methods illustrated in FIGS. 1-12. The processor 412 by reading the memory 414 is able to load and execute the computer program 416.

The blocks illustrated in the FIGS. 8 and 9 may represent steps in a method and/or sections of code in the computer program 416. The illustration of a particular order to the blocks does not necessarily imply that there is a required or preferred order for the blocks and the order and arrangement of the block may be varied. Furthermore, it may be possible for some blocks to be omitted.

The preceding description describes, in relation to FIGS. 1 to 7, a system, apparatus 30, method 60 and computer program 48 that enables control of a virtual visual space 20 and the virtual visual scene 26 dependent upon the virtual visual space 20.

The preceding description describes. in relation to FIGS. 8 to 10, a system 100, apparatus 400, method 200 and computer program 416 that enables control of a sound space and the sound scene dependent upon the sound space.

In some but not necessarily all examples, the virtual visual space 20 and the sound space may be corresponding. "Correspondence" or "corresponding" when used in relation to a sound space and a virtual visual space means that the sound space and virtual visual space are time and space aligned, that is they are the same space at the same time.

The correspondence between virtual visual space and sound space results in correspondence between the virtual visual scene and the sound scene. "Correspondence" or "corresponding" when used in relation to a sound scene and a virtual visual scene means that the sound space and virtual visual space are corresponding and a notional listener whose point of view defines the sound scene and a notional viewer whose point of view defines the virtual visual scene are at the same position and orientation, that is they have the same point of view.

The following description describes in relation to FIGS. 11 to 26 a method 500 that enables control of a virtual visual space 20 to provide mediated reality (e.g. virtual reality or augmented reality) and control of the sound space to control the position of sound objects within a sound space that corresponds to the virtual visual space 20.

The method 500 may be performed by a system as previously described, an apparatus as previously described and/or a computer program as previously described.

Figure 11:
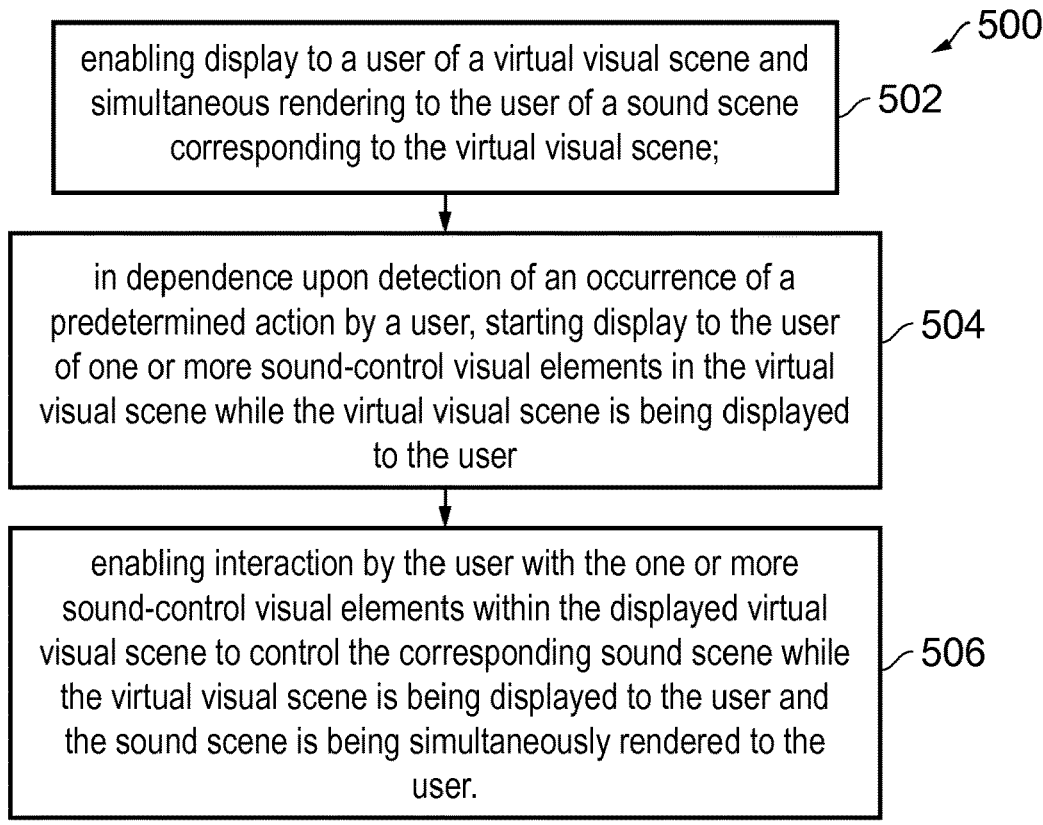
FIG. 11 illustrates an example of a method for controlling a rendered sound scene using user-interactive mediated reality, for example, virtual reality or augmented reality.

FIG. 11 illustrates an example of the method 500. In this example, the method 500 is a method for controlling a rendered sound scene using user-interactive mediated reality, for example, virtual reality or augmented reality.

At block 502, the method 500 comprises: enabling display, to a user, of a virtual visual scene and simultaneous rendering, to the user, of a sound scene corresponding to the virtual visual scene.

Then at block 504, the method 500 comprises: in dependence upon detection of an occurrence of a predetermined action by a user, starting display to the user of one or more sound-control visual elements in the virtual visual scene while the virtual visual scene is being displayed to the user.

Then at block 506, the method 500 comprises: enabling interaction by the user with the one or more sound-control visual elements within the displayed virtual visual scene to enable control of the corresponding sound scene while the virtual visual scene is being displayed to the user and the sound scene is being simultaneously rendered to the user.

Figure 12:
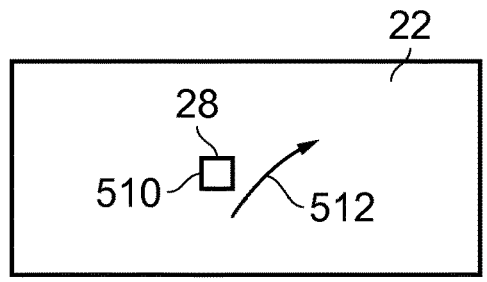
FIG. 12 illustrates movement of a sound-control visual element in a visual scene for controlling a sound scene corresponding with the virtual visual scene.

FIG. 12 illustrates an example of a computer-generated visual element 28 in a virtual visual scene 22 displayed according to the method 500. The visual element 28 in this example is a sound-control visual element 510. The user interacts with the sound-control visual element 510 within the displayed virtual visual scene 22 to control a sound scene that corresponds with the virtual visual scene 22. The interaction occurs while the virtual visual scene 22 is being displayed to the user and the corresponding sound scene, controlled by the user via the interaction, is being simultaneously rendered to the user.

In this example, the method at block 506 enables interaction between the user and the sound-control visual element 510 within the virtual visual scene 22 that enables control of the corresponding sound scene. This control is achieved by enabling movement 512 of the sound-control visual element 510 within the virtual visual scene 22 while the virtual visual scene 22 is being displayed to the user.

Figures 13A, 13B:
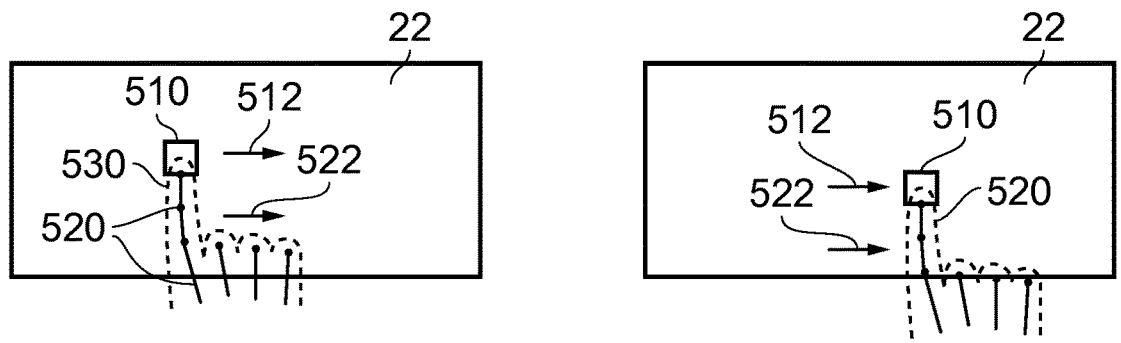
FIGS. 13A and 13B illustrate selection then movement of a sound-control visual element in a virtual visual scene, the movement controlling a sound scene corresponding with the virtual visual scene.

FIGS. 13A and 13B illustrate an example of the method 500 similar to FIG. 12. The user interacts with the sound-control visual element 510 within the displayed virtual visual scene 22 to move the sound-control visual element 510 within the displayed virtual visual scene 22 while the virtual visual scene 22 is being displayed to the user and the sound scene is being simultaneously rendered to the user. The movement of the sound-control visual element 510 controls a sound scene that corresponds with the displayed virtual visual scene 22 while the virtual visual scene is being displayed to the user and the corresponding sound scene, controlled by the user via the interaction, is being simultaneously rendered to the user.

In FIGS. 13A and 13B, the virtual visual scene 22 comprises different visual elements 28 including one or more sound-control visual elements 510, as described with reference to FIG. 12, and one or more user visual elements 520 representing the user. In this example, one or more user visual elements 520 are a representation of at least a tip of a finger of the user.

In this example, the method 500 at block 506 comprises: displaying to the user, in the virtual visual scene 22, one or more user visual elements 520 representing at least a tip of a finger of a hand of the user while the virtual visual scene 22 is being displayed to the user; and enabling the one or more user visual elements 520 to touch (FIG. 13A) and move (FIG. 13B) at least one sound-control visual element 510 within the virtual visual scene 22 while the virtual visual scene 22 is being displayed to the user and the sound scene is being simultaneously rendered to the user.

In FIG. 13A, a user visual element 520 representing the user's fingertip touches the sound-control visual element 510. This 'selecting' user visual element 520 'selects' the sound-control visual element 510. Subsequent movement 522 of the selecting user visual elements 520 touching (selecting) the sound-control visual element 510 causes equivalent movement of the selected sound-control visual element 510.

FIG. 13B, illustrates the results of movement 522 of the selecting user visual element 520 and the equivalent movement 512 of the selected sound-control visual element 510. The selected sound-control visual element 510 has been moved. In this example, the movement 512 is illustrated as a translation, it may however, by any type of movement such as for example a rotation.

The movement 522 of the selecting user visual element 520 in the virtual visual scene 22 is in response to and proportional to actual movement of the user's hand in real space and the equivalent movement 512 of the selected sound-control visual element 510 is also in response to and equivalently proportional to actual movement of the user's hand in real space. The selecting user visual element 520 and the selected sound-control visual element 510 move together in the virtual visual scene 22 in response to and in proportional to actual movement of the user's hand in real space.

The movement 512 of the selected sound-control visual element 510 controls at least one property of a sound object in the sound space. The property may, for example, be a location or position of the sound object in the sound space and/or an audio property of the sound object, for example, loudness, frequency equalization, or applied effect such as reverberation, for example.

FIG. 14A-21A illustrate examples of the method 500 to alter one or more audio an audio properties of a sound object using a mixing console 600. The mixing console 600 is a physical controller existing in real space 10 that is physically interacted with by the user 700.

The mixing console 600 comprises a plurality of parallel channel strips 602. A channel strip 602 controls the audio properties of an audio channel. A sound object may be defined by one or more audio channels. A sound scene may be defined by multiple audio channels. Changing the audio properties of an audio channel therefore changes the sound scene.

In this example each channel strip 602 comprises as an input device a slider 604 that slides along a track 606. The tracks 606 of the parallel channel strips 602 are parallel.

In this example each channel strip 602 comprises as input devices a plurality of knobs 608 that rotate.

The input devices 604, 608 may be touch sensitive so that it can be detected when a user touches (selects) an input device of the mixing console 600.

In some but not necessarily all examples, the input devices 604, 608 of a channel strip 602 are used to control, for that channel, volume (gain level) and/or frequency spectrum distribution (equalization) and/or stereo distribution or other effects.

Figure 14A:
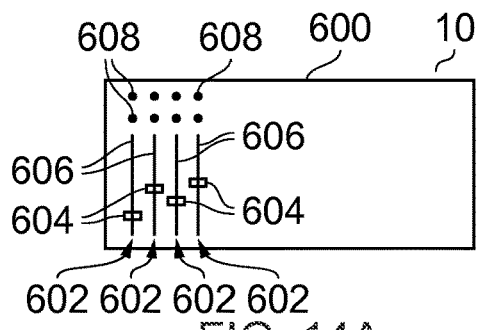
FIGS. 14A, 15A, 16A illustrate a mixing console at successive times
Figure 14B:
FIGS. 14B, 15B, 16B illustrate a virtual visual scene adapted in dependence upon the single touch input by the user at the mixing console.
Figure 15A:
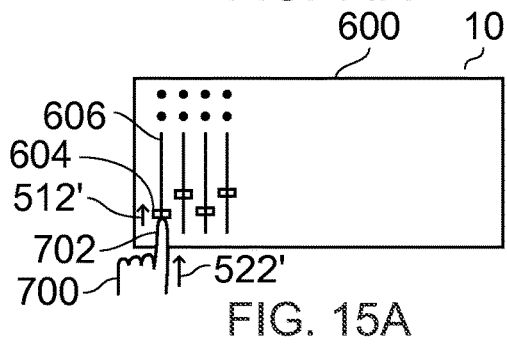
Figure 15B:
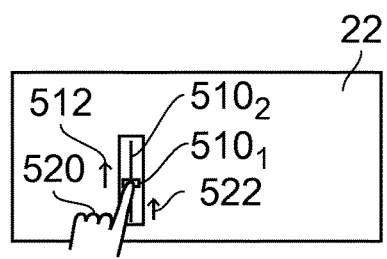
Figure 16A:
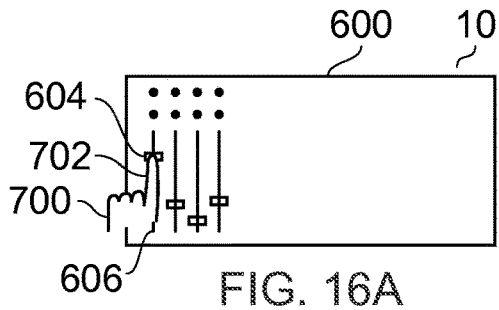
Figure 16B:
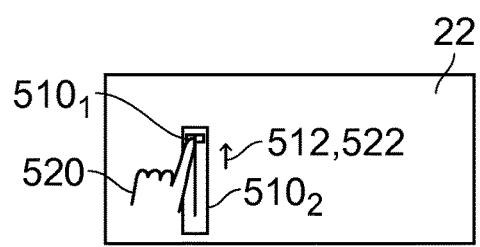

FIGS. 14A, 15A, 16A illustrate a mixing console 600 in use by a user 700. FIGS. 15B, 16B illustrate a virtual visual scene 22 adapted in dependence upon the physical interaction by the user 700 with the physical controller 600 in FIGS. 15A, 16A.

In FIG. 14A, the user does not interact with the mixing controller 600. The virtual visual scene 22 in FIG. 14B does not include one or more user visual elements 520 representing the user 700 and does not include one or more sound-control visual elements 510.

The method 500, performing block 502 (FIG. 11), enables display to the user 700 of a virtual visual scene 22 and simultaneous rendering to the user 700 of a sound scene corresponding to the virtual visual scene 22.

In FIG. 15A, the user 700 interacts with the mixing controller 600. A fingertip 702 of the hand of the user 700 touches a touch-sensitive slider 604 of the mixing console 600.

At block 504 (FIG. 11), the method 500 comprises, as illustrated in FIG. 15B: in dependence upon detection of an occurrence of a predetermined action by a user (touching the slider 604), starting display to the user 700 of one or more sound-control visual elements 510 in the virtual visual scene 22 while the virtual visual scene 22 is being displayed to the user 700 and the sound scene corresponding to the virtual visual scene 22 is being simultaneously rendered to the user 700.

In FIG. 15B, the one or more sound-control visual elements 510 displayed in the virtual visual scene 22 create a visual representation of a portion of the mixing console 600 comprising the touched slider 604. For example, displayed sound-control visual elements 510 may create a visual representation of all or part of the channel strip 602 comprising the touched slider 604.

In the example illustrated, a first sound-control visual elements $510_1$ corresponds to the touched slider 604 and a second sound-control visual elements $510_2$ corresponds to the track 606 in which the touched slider 604 slides.

One or more user visual elements 520 representing the user's fingertip in the virtual visual scene 22 touch the first sound-control visual element $510_1$. This 'selects' the first sound-control visual element $510_1$.

Then at block 506 (FIG. 11), the method 500 enables interaction by the user with the first sound-control visual element $510_1$ within the displayed virtual visual scene 22

Movement 522' of the user's selecting finger 702 in real space causes movement 512' of the touched slider 604 in real space and, in the virtual visual scene 22 illustrated in FIG. 15B, causes equivalent movement 522 of the selecting user visual element 520 touching the first sound-control visual element $510_1$ and causes equivalent movement 512 of the first sound-control visual element $510_1$.

In some embodiments, actual control of the audio channel may result from real movement 512' of the touched slider 604. In other embodiments, actual control of the audio channel may result from virtual movement 512 of the first sound-control visual element $510_1$ representing the touched slider 604. In this way, the method 500 enables control of the corresponding sound scene while the virtual visual scene 22 is being displayed to the user 700 and the sound scene is being simultaneously rendered to the user 700.

FIG. 16A, illustrates the mixing console 600 as the user finishes interacting with the mixing consoler 600. A fingertip 702 of the hand of the user 700 touching the touch-sensitive slider 604 of the mixing console 600 has been moved by movement 522' along the slide 606.

FIG. 16B, illustrates the results of movement 522 of the selecting user visual element 520 and the movement 512 of the selected first sound-control visual element $510_1$. The first sound-control visual element $510_1$ representing the slider 604 has been moved relative to the second sound-control visual element $510_2$ representing the slide 606 which has remained stationary.

Figure 17A:
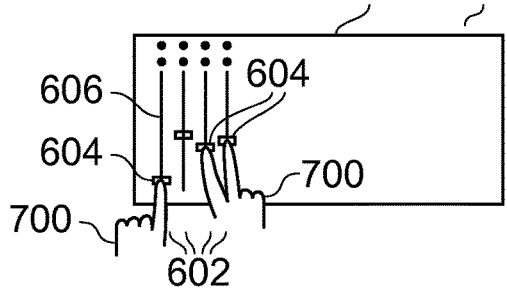
FIGS. 17A, 18A illustrate a mixing console
Figure 17B:
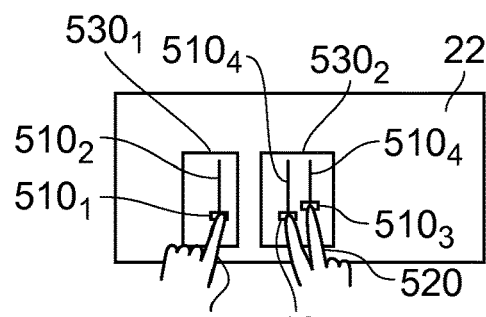
FIGS. 17B, 18B illustrate a virtual visual scene adapted in dependence upon multi-touch sliding inputs by the user at the mixing console.

FIGS. 17A and 17B, are similar to FIGS. 15A and 15B, and FIGS. 18A and 18B, are similar to FIGS. 16A and 16B but instead of illustrating user movement of a single slider 604, they illustrate user movement of multiple sliders 604 simultaneously.

In FIG. 17A, the user 700 interacts with the mixing controller 600 by touching a touch-sensitive slider 604 of the mixing console 600 using one fingertip 702 of the left hand and by touching two touch-sensitive sliders 604 of the mixing console 600 using two finger tips 702 of the right hand.

While the virtual visual scene 22 is being displayed to the user and the corresponding sound scene is being rendered to the user, in response to detecting the touching of the sliders 604 by the user, the visual scene 22 starts to display two different sets 530 of sound-control visual elements 510 in the virtual visual scene 22.

The left set $530_1$ of sound-control visual elements 510 creates a visual representation of a portion, for example a channel strip 602, of the mixing console 600 comprising only the slider 604 touched by the left hand. In the example illustrated, a first sound-control visual element $510_1$ corresponds to the touched slider 604 and a second sound-control visual element $510_2$ corresponds to the track 606 in which the touched slider 604 slides.

One or more user visual elements 520 representing the user's fingertip of the left hand in the virtual visual scene 22 touch the first sound-control visual element $510_1$. This 'selects' the first sound-control visual element $510_1$.

The right set $530_2$ of sound-control visual elements 510 creates a visual representation of a portion, for example a channel strip 602, of the mixing console 600 comprising only the sliders 604 touched by the right hand. In the example illustrated a sound-control visual element $510_3$ corresponds to each touched slider 604 and a sound-control visual element $510_4$ corresponds to the track 606 in which the touched sliders 604 slide.

The user visual elements 520 representing the user's finger tips of the right hand in the virtual visual scene 22 touch the sound-control visual elements $510_3$ in the right set $530_2$. This 'selects' those sound-control visual element $510_3$.

Movement of the user's selecting fingers in real space causes movement of the touched sliders 604 in real space and, in the virtual visual scene 22, causes equivalent movement of the selecting user visual element 520 touching the selected sound-control visual elements $510_1$, $510_3$ and causes equivalent movement 512 of the selected sound-control visual elements $510_1$, $510_3$.

In some embodiments, actual control of the audio channel may result from real movement of the touched sliders 604. In other embodiments, actual control of the audio channel may result from virtual movement of the selected sound-control visual elements $510_1$, $510_3$ representing the touched sliders 604.

Figure 18A:
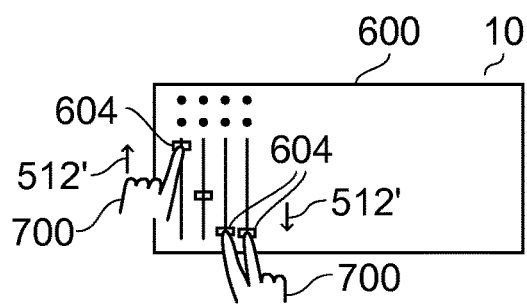
Figure 18B:
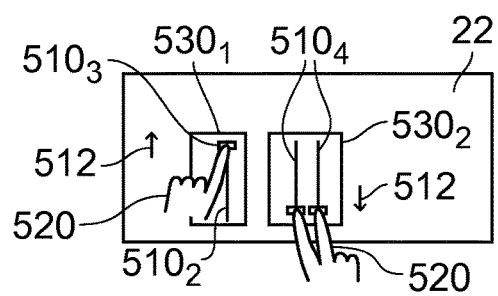

FIG. 18A, illustrates the mixing console 600 as the user finishes interacting with the mixing consoler 600. FIG. 18B, illustrates the results of movement of the selecting user visual elements 520 and the movement of the selected sound-control visual elements $510_1$, $510_3$. The sound-control visual elements $510_1$, $510_3$ representing the touched/selected sliders 604 have been moved relative to the sound-control visual elements $510_2$, $510_4$ representing the slides 606 which have remained stationary.

The two sets 530 of selected sound-control visual elements 510 are distinct and independent. In FIGS. 17A, 18A an inter-set intermediate channel strip 602, lies between the channel strip 602 represented by the left set $530_1$ of sound-control visual elements 510 and the two channels strips 602 represented by the right set $530_2$ of sound-control visual elements 51. This intermediate channel strip 602 is not represented by any sound-control visual elements 510 in the virtual visual scene 22, it is invisible.

An intra-set intermediate channel strip 602 may lie between the multiple channels strips 602 represented by a set 530 of sound-control visual elements 510. In one implementation, these intra-set intermediate channel strips 602 are not represented by any sound-control visual elements 510 in the virtual visual scene 22 and are invisible. In another implementation, these intra-set intermediate channel strips 602 are represented by sound-control visual elements 510 in the virtual visual scene 22 that do not move.

FIGS. 19A and 19B, are similar to FIGS. 17A and 17B, and FIGS. 20A and 20B, are similar to FIGS. 18A and 18B but instead of having the two distinct sets of selected sound-control visual elements 510 instead has a larger set 530 of selected and unselected sound-control visual elements 510.

In FIGS. 19A, 20A intermediate touched and untouched channel strips 602, lie between a leftmost touched channel strip 602 and a rightmost touched channel strip. All the channel strips between and including the leftmost touched channel strip 602 and the rightmost touched channel strip 602 are represented by sound-control visual elements 510.

In FIG. 19A, the user 700 interacts with the mixing controller 600 by touching a touch-sensitive slider 604 of the mixing console 600 using one fingertip 702 of the left hand and by touching two touch-sensitive sliders 604 of the mixing console 600 using two finger tips 702 of the right hand.

In FIG. 19B, while the virtual visual scene 22 is being displayed to the user and the corresponding sound scene is being rendered to the user, in response to detecting the touching of the sliders 604 by the user, the visual scene 22 starts to display a single set 530 of sound-control visual elements 510 in the virtual visual scene 22.

The set 530 of sound-control visual elements 510 creates a visual representation of a continuous portion of the mixing console 600 comprising the sliders 604 touched by the user. In the example illustrated a first sound-control visual element $510_1$ corresponds to each slider 604 and a second sound-control visual element $510_2$ corresponds to the track 606 in which the slider 604 can slide.

One or more user visual elements 520 representing the user's finger tips in the virtual visual scene 22 touch the sound-control visual elements 510 representing the physical sliders 604 touched in real space. This 'selects' sound-control visual element $510_1$.

Movement of the user's selecting fingers in real space causes movement of the touched sliders 604 in real space and, in the virtual visual scene 22, causes equivalent movement of the selecting user visual element 520 touching the selected sound-control visual elements 510 and causes equivalent movement 512 of the selected sound-control visual element 510.

In some embodiments, actual control of the audio channel may result from real movement of the touched sliders 604. In other embodiments, actual control of the audio channel may result from virtual movement of the selected sound-control visual elements 510 representing the touched sliders 604.

FIG. 20A, illustrates the mixing console 600 as the user finishes interacting with the mixing consoler 600. FIG. 20B, illustrates the results of movement of the selecting user visual elements 520 and the movement of the selected sound-control visual elements 510. The sound-control visual elements $510_1$ representing the touched sliders 604 have been moved relative to the sound-control visual element $510_2$ representing the slides 606 which has remained stationary.

In the examples illustrated, particularly those where a user has multiple touch points on the physical controller 600, the methods may use this information to orient the physical controller 600 with respect to the user 700 in real space and replicate this orientation in the virtual visual scene 22 by controlling the orientation of the collection of sound-control visual elements 510 representing the controller 600 relative to the collection of user visual elements 520 representing the user 700. It will be appreciated that three touch points are sufficient to accurately orient an unconstrained plane. However, if an assumption is made concerning an imposed constraint, for example, that the plane is vertical or horizontal then only two touch points are sufficient to accurately orient an constrained plane Referring back to FIG. 15A, 15B, the hand of the user 700 touches a portion (touch-sensitive slider 604) of the mixing console 600. The method displays to the user 700 one or more sound-control visual elements 510 in the virtual visual scene 22 creating a visual representation of at least the touched portion of the mixing console 600. Displayed sound-control visual elements 510 may create a visual representation of all or part of the channel strip 602 comprising the touched slider 604.

If the user touches a first portion of the mixing console 600, the displayed sound-control visual elements 510 create a visual representation of that first portion, for example, all or part of the channel strip 602 touched by the user.

If the user then touches a second portion (instead of the first portion) of the mixing console 600, the displayed sound-control visual elements 510 create a visual representation of the second portion (instead of the first portion), for example, all or part of the channel strip 602 touched by the user.

If the user touches simultaneously both the first portion and the second portion of the mixing console 600, then displayed sound-control visual elements 510 create a visual representation of the first portion and the second portion, for example, all or part of the channel strips 602 touched by the user.

In some examples (FIGS. 17A, 17B, 18A, 18B) displayed sound-control visual elements 510 create distinct and separate visual representations of only the currently touched portions and are displayed as two different sets 530 of sound-control visual elements 510.

In some examples (FIGS. 19A, 19B, 20A, 20B) displayed sound-control visual elements 510 create visual representations of the currently touched portions and at least intermediate untouched portions between the touched portions and are displayed as one set 530 of sound-control visual elements 510. The system has automatically expanded the visual representation to include untouched portions between the touched portions.

In some examples displayed sound-control visual elements 510 create visual representations of the currently touched portions, the intermediate untouched portions between the touched portions and at least some other portions for example untouched portions that are adjacent the touched portions but not between the touched portions These displayed sound-control visual elements 510 are displayed as one set 530 of sound-control visual elements 510. The system has automatically expanded the visual representation to include untouched portions between the touched portions and adjacent the touched portions.

In some embodiments, actual control of the audio channel may result from real movement of a touched slider 604. In other embodiments, actual control of the audio channel may result from virtual movement of a sound-control visual element 510 representing a slider 604.

It will be appreciated that although the above examples have been presented in relation to a the mixing console 600, they are applicable to any user input device touched by a user.

As one example, if a user is using a QWERTY keyboard and presses the S key and F key, the system may display a whole virtual keyboard. The displayed sound-control visual elements 510 create visual representations of whole keyboard. In some examples, it may be assumed that the input plane comprising the keys of the keyboard is horizontal and the two touch points may be used orient the virtual keyboard in virtual space with a corresponding orientation to the physical keyboard in real space.

FIGS. 21A and 21B, are similar to FIGS. 15A and 15B, but instead of illustrating sliding movement of a slider 604, they illustrate rotating movement of a knob 608.

In FIG. 21A, the user 700 interacts with the mixing controller 600 by touching a touch-sensitive knob 608 of the mixing console 600 using two finger tips 702 of the right hand.

While the virtual visual scene 22 is being displayed to the user and the corresponding sound scene is being rendered to the user, in response to detecting the touching of the knob 608 by the user, the visual scene 22 starts to display one or more sound-control visual elements 510 in the virtual visual scene 22.

The one or more sound-control visual elements 510 create a visual representation of a portion, for example a channel strip 602, of the mixing console 600 comprising the knob 608 touched. In the example illustrated a first sound-control visual element $510_1$ corresponds to the touched knob 608 and a second sound-control visual element $510_2$ corresponds to the console 600 in which the touched slider 604 rotates.

One or more user visual elements 520 representing the user's finger tips in the virtual visual scene 22 touch the first sound-control visual element $510_1$. This 'selects' the first sound-control visual element $510_1$.

Movement of the user's selecting fingers 702 in real space causes movement (rotation) of the touched knob 608 in real space and, in the virtual visual scene 22, causes equivalent movement of the selecting user visual element 520 touching the selected sound-control visual element $510_1$ and causes equivalent movement 512 (rotation) of the selected sound-control visual element $510_1$.

In some embodiments, actual control of the audio channel may result from real movement of the touched knob 608. In other embodiments, actual control of the audio channel may result from virtual movement of the selected sound-control visual elements $510_1$ representing the touched knob 608.

FIG. 22A-25B illustrate another example of an application of the method 500 for re-positioning a sound object in a sound scene. In FIG. 22A, a predetermined action (gesture 80) by a user 700, triggers, as illustrated in FIG. 22B, display in a virtual visual scene 22 of a sound-control visual element 510 while simultaneously rendering, to the user, a sound scene corresponding to the virtual visual scene.

The sound-control visual element 510 is associated with a sound object in the sound scene corresponding to the displayed virtual visual scene 22. The sound-control visual element 510 is a visual representation of the associated sound object. The location of the sound-control visual element 510 within the displayed virtual scene 22 corresponds to the location of the associated sound object within the corresponding sound scene.

FIGS. 23A-25B illustrate interaction by the user 700 with the sound-control visual element 510 within the displayed virtual visual scene 22. The interaction results in a change in position of the sound-control visual element 510 within the displayed virtual scene 22, which causes a corresponding change in position, within the sound scene/space, of the sound object to which the moved sound-control visual element 510 is associated. The change of position of the sound object within the sound scene/space occurs while the sound scene is being rendered to the user. The user interaction therefore enables control of the corresponding sound scene while the virtual visual scene is being displayed to the user and the sound scene is being simultaneously rendered to the user.

In FIG. 23A, a user's fingertip 702 in the real space 10 is moved causing, as illustrated in FIG. 23B, the one or more user visual elements 520 representing the user's fingertip in the virtual visual scene 22 to move and touch the sound-control visual element 510 representing the sound object. This 'selects' the sound-control visual element 510.

Movement 522' of the user's selecting finger 702 in real space (FIG. 24A) causes, in the virtual visual scene 22 (FIG. 24B), equivalent movement 522 of the selecting user visual element 520 touching the sound-control visual element 510 and causes equivalent movement 512 of the selected sound-control visual element 510. The selecting user visual element 520 and the sound-control visual element 510 move together.

As the selected sound-control visual element 510 moves in the virtual visual scene 22, the sound object associated with the selected sound-control visual element 510 moves in a corresponding fashion in the corresponding sound scene, while the sound scene is being rendered to the user. The user therefore has real-time feedback as to the consequences of moving the sound object in the sound scene.

FIG. 25A illustrates the fingertip 702 of the hand of the user 700 at the end of movement. FIG. 25B, illustrates the results of movement 522 of the selecting user visual element 520 and the movement 512 of the selected sound-control visual element 510. After a hiatus (a period on non-movement) the selected first sound-control visual element 510 is removed from the virtual visual scene 22.

In FIG. 22B the user's fingers are not represented by one or more user visual elements 520 in the virtual visual scene 22. However, in other examples, the user's fingers are represented by one or more user visual elements 520 in the virtual visual scene 22. The gesture 80 performed in the real space is therefore also performed in the virtual scene 22. The location of where the gesture is performed within the virtual visual scene may select which one of a plurality of different sound objects are selected for modification. In one example, the gesture is a click of a user's digits. If the gesture is performed beside a visual representation of a sound source, then the sound object that is modified by the user interaction is the sound object for that sound source.

In the foregoing examples, reference has been made to a computer program or computer programs. A computer program, for example either of the computer programs 48, 416 or a combination of the computer programs 48, 416 may be configured to perform the method 500.

Also as an example, an apparatus 30, 400 may comprises:
at least one processor 40, 412; and
at least one memory 46, 414 including computer program code the at least one memory 46, 414 and the computer program code configured to, with the at least one processor 40, 412, cause the apparatus 30, 400 at least to perform:

enabling display to a user of a virtual visual scene and simultaneous rendering to the user of a sound scene corresponding to the virtual visual scene;

in dependence upon detection of an occurrence of a predetermined action by a user, starting display to the user of one or more sound-control visual elements in the virtual visual scene while the virtual visual scene is being displayed to the user; and enabling interaction by the user with the one or more sound-control visual elements within the displayed virtual visual scene to enable control of the corresponding sound scene while the virtual visual scene is being displayed to the user and the sound scene is being simultaneously rendered to the user.

The computer program 48, 416 may arrive at the apparatus 30, 400 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48, 416. The delivery mechanism may be a signal configured to reliably transfer the computer program 48, 416. The apparatus 30, 400 may propagate or transmit the computer program 48, 416 as a computer data signal. FIG. 10 illustrates a delivery mechanism 430 for a computer program 416.

It will be appreciated from the foregoing that the various methods 500 described may be performed by an apparatus 30, 400, for example an electronic apparatus 30, 400.

The electronic apparatus 400 may in some examples be a part of an audio output device 300 such as a head-mounted audio output device or a module for such an audio output device 300. The electronic apparatus 400 may in some examples additionally or alternatively be a part of a head-mounted apparatus 33 comprising the display 32 that displays images to a user.

In some examples, the placement of the head-mounted apparatus 33 onto the head of a user may cause the system to perform or to be able to perform the method 500 illustrated in FIG. 11. That is, while the head-mounted apparatus 33 is not placed on a head of a user, the method 500 is not operational. When the head-mounted apparatus is placed on a head of a user, the method 500 becomes operational enabling control of a sound scene using first perspective, user-interactive, mediated reality (virtual reality or augmented reality).

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks, steps and processes illustrated in the FIGS. 11-25 may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42 or controller 410 may, for example be a module. The apparatus may be a module. The display 32 may be a module.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
at least one processor; and
at least one memory including computer program code,
the at least one memory and the computer program code configured to, with the at least one processor, cause the apparatus to perform at least the following:
cause display of a virtual visual scene on a display screen;
detect a first user input selecting an input device of a physical controller device existing in real space in a separate physical device than the display screen, wherein the physical controller device comprises a plurality of input devices to control audio properties of audio channels;
in response to the first user input on the physical controller device, create a visual representation of a portion of the physical device and cause display of one or more control visual elements augmented on the virtual visual scene, the one or more control visual elements corresponding to the selected input device of the physical controller device, and configured to control at least one audio property of an audio channel thereof with the virtual visual scene as the virtual visual scene is displayed;
receive a second user input manipulating the selected input device of the physical controller device in real space; and
cause the one or more control visual elements to be commensurately manipulated on the display to reflect the second user input on the physical controller device in real space, wherein the augmented one or more control visual elements are time-aligned with the displayed virtual visual scene such that in a particular instance, a respective one or more control visual element on the display screen indicates the respective audio properties, controlled via the physical controller device in real space, associated with a displayed frame of the virtual visual scene displayed on the display screen.

2. An apparatus as claimed in claim 1, wherein the at least one memory and the computer program code are further configured to, with the at least one processor, cause the apparatus to perform at least:
cause display, in the virtual visual scene, of one or more user visual elements representing at least a tip of a finger of a user while the virtual visual scene is being displayed; and
enable the one or more user visual elements to touch and move at least one control visual element within the virtual visual scene while the virtual visual scene is being displayed to the user.

3. An apparatus as claimed in claim 1, wherein the at least one memory and the computer program code are further configured to, with the at least one processor, cause the apparatus to perform at least:
orientate the control visual elements within the virtual visual scene dependent upon a relative orientation between the physical controller device and the user.

4. An apparatus as claimed in claim 1, wherein the physical controller device is a mixing console comprising multiple tracks of the input devices each having an associated touch sensitive slider wherein the predetermined action by the user is touching one or more sliders of the mixing console.

5. An apparatus as claimed in claim 4, wherein the one or more control visual elements displayed in the virtual visual scene represents at least each touched slider and its associated track.

6. An apparatus as claimed in claim 1, wherein the at least one memory and the computer program code are further configured to, with the at least one processor, cause the apparatus to perform at least: enable simultaneous rendering to the user of a sound scene corresponding to the virtual visual scene while displaying the virtual visual scene.

7. The apparatus according to claim 1, wherein the displayed one or more control visual elements augmented on the virtual visual scene correspond to a first subset of respective controls of the physical controller device, wherein the at least one memory and the computer program code are further configured to, with the at least one processor, cause the apparatus to:
in response to receiving a subsequent indication of a subsequent user-manipulation of at least another one of the one or more controls of the physical controller device, expand the displayed one or more control visual elements augmented on the virtual visual scene to correspond to a second subset of respective controls of the physical controller device, larger than the first subset.

8. A method comprising:
causing display of a virtual visual scene on a display screen;
detecting a first user input selecting an input device of a physical controller device existing in real space in a separate physical device than the display screen, wherein the physical controller device comprises a plurality of input devices to control audio properties of audio channels;
in response to the first user input on the physical controller device, creating a visual representation of a portion of the physical device and causing display of one or more control visual elements augmented on the virtual visual scene, the one or more control visual elements corresponding to the selected input device of the physical controller device, and configured to control at least one audio property of an audio channel thereof with the virtual visual scene as the virtual visual scene is displayed;

receiving a second user input manipulating the selected input device of the physical controller device in real space; and causing the one or more control visual elements to be commensurately manipulated on the display to reflect the second user input on the physical controller device in real space, wherein the augmented one or more control visual elements are time-aligned with the displayed virtual visual scene such that in a particular instance, a respective one or more control visual element indicates on the display screen the respective audio properties, controlled via the physical controller device in real space, associated with a displayed frame of the virtual visual scene displayed on the display screen.

9. The method of claim 8, further comprising:

causing display, in the virtual visual scene, of one or more user visual elements representing at least a tip of a finger of a user while the virtual visual scene is being displayed; and enabling the one or more user visual elements to touch and move at least one control visual element within the virtual visual scene while the virtual visual scene is being displayed to the user.

10. The method of claim 8, further comprising:

orientating the control visual elements within the virtual visual scene dependent upon a relative orientation between the physical controller device and the user.

11. The method of claim 8, wherein the physical controller device is a mixing console comprising multiple tracks of the input devices each having an associated touch sensitive slider, and wherein the predetermined action by the user is touching one or more sliders of the mixing console.

12. The method of claim 8, wherein the one or more control visual elements displayed in the virtual visual scene represents at least each touched slider and its associated track.

13. The method of claim 8, further comprising:

enabling simultaneous rendering to the user of a sound scene corresponding to the virtual visual scene while displaying the virtual visual scene.

14. The method of claim 8, wherein the displayed one or more control visual elements augmented on the virtual visual scene correspond to a first subset of respective controls of the physical controller device, and wherein the method further comprises:

in response to receiving a subsequent indication of a subsequent user-manipulation of at least another one of the one or more controls of the physical controller device, expanding the displayed one or more control visual elements augmented on the virtual visual scene to correspond to a second subset of respective controls of the physical controller device, larger than the first subset.

15. A computer program product comprising at least one non-transitory computer-readable storage medium having computer-executable program code instructions stored therein, the computer-executable program code instructions comprising program code instructions to:

cause display of a virtual visual scene on a display screen;

detect a first user input selecting an input device of a physical controller device existing in real space in a separate physical device than the display screen, wherein the physical controller device comprises a plurality of input devices to control audio properties of audio channels;

in response to the first user input on the physical controller device, create a visual representation of a portion of the physical device and cause display of one or more control visual elements augmented on the virtual visual scene, the one or more control visual elements corresponding to the selected input device of the physical controller device, and configured to control at least one audio property of an audio channel thereof with the virtual visual scene as the virtual visual scene is displayed;

receive a second user input manipulating the selected input device of the physical controller device in real space; and cause the one or more control visual elements to be commensurately manipulated on the display to reflect the second user input on the physical controller device in real space, wherein the augmented one or more control visual elements are time-aligned with the displayed virtual visual scene such that in a particular instance, a respective one or more control visual element on the display screen indicates the respective audio properties, controlled via the physical controller device in real space, associated with a displayed frame of the virtual visual scene displayed on the display screen.

16. The computer program product of claim 15, wherein the computer-executable program code instructions further comprise program code instructions to:

cause display, in the virtual visual scene, of one or more user visual elements representing at least a tip of a finger of a user while the virtual visual scene is being displayed; and enable the one or more user visual elements to touch and move at least one control visual element within the virtual visual scene while the virtual visual scene is being displayed to the user.

17. The computer program product of claim 15, wherein the computer-executable program code instructions further comprise program code instructions to:

orientate the control visual elements within the virtual visual scene dependent upon a relative orientation between the physical controller device and the user.

18. The computer program product of claim 15, wherein the physical controller device is a mixing console comprising multiple tracks of the input devices each having an associated touch sensitive slider, and wherein the predetermined action by the user is touching one or more sliders of the mixing console.

19. The computer program product of claim 15, wherein the one or more control visual elements displayed in the virtual visual scene represents at least each touched slider and its associated track.

20. The computer program product of claim 15, wherein the displayed one or more control visual elements augmented on the virtual visual scene correspond to a first subset of respective controls of the physical controller device, and wherein the computer-executable program code instructions further comprise program code instructions to:

in response to receiving a subsequent indication of a subsequent user-manipulation of at least another one of the one or more controls of the physical controller device, expand the displayed one or more control visual elements augmented on the virtual visual scene to correspond to a second subset of respective controls of the physical controller device, larger than the first subset.

* * * * *